United States Patent [19]

Krummenacher

[11] Patent Number: 5,098,510

[45] Date of Patent: Mar. 24, 1992

[54] WINDING DEVICE

[75] Inventor: Bruno Krummenacher, Tagerwilen, Switzerland

[73] Assignee: The Dow Chemical Company, Midland, Mich.

[21] Appl. No.: 563,883

[22] Filed: Aug. 6, 1990

Related U.S. Application Data

[62] Division of Ser. No. 307,376, Feb. 7, 1989, abandoned.

[30] Foreign Application Priority Data

Feb. 18, 1988 [CH] Switzerland .................... 593/88

[51] Int. Cl.⁵ .......................... B32B 17/04; F16F 1/16
[52] U.S. Cl. .................................. 156/433; 156/446; 267/148; 425/111
[58] Field of Search ............... 156/166, 170, 173, 174, 156/175, 169, 192, 245, 433, 446, 425, 428, 427, 172; 264/257, 258, 136, 137, 138; 425/111; 267/148

[56] References Cited

U.S. PATENT DOCUMENTS 4,414,049  11/1983  Jones .................... 156/166
4,460,531  7/1984   Harris ................... 156/173
4,565,356  1/1986   Nickel ................... 264/257
4,659,071  4/1987   Woltron .................. 264/258
4,707,317  11/1987  Epel et al. .............. 264/258

FOREIGN PATENT DOCUMENTS 0005916  12/1979  European Pat. Off. .
0200076  11/1986  United Kingdom ........... 264/258

OTHER PUBLICATIONS

Patent Abstracts of Japan, Tsuneo Mizuno, Molded Leaf Spring For Automobile, 04/04/80, vol. 6, No. 23, (M-111) [901] Feb. 10, 1982, Int. Cl.

Primary Examiner—Jay H. Woo
Assistant Examiner—Jeremiah F. Durkin, II

[57] ABSTRACT

A winding device having a rotational axis and two side walls arranged perpendicular to the rotational axis. Each side wall is provided with two slits extending from the middle portion to both extreme ends of the side wall. A supply of bolts is arranged to the winding device whereby the bolts have a smaller diameter than the width of the slits and a greater length than the distance between the two side walls.

17 Claims, 3 Drawing Sheets

WINDING DEVICE

CROSS-REFERENCE TO RELATED APPLICATION

This is a divisional application of U.S. patent application Ser. No. 307,376, filed Feb. 7, 1989 by Bruno Krummenacher, now abandoned.

This application is based on Swiss Patent appliation No. 593/88 filed in Switzerland on Feb. 18, 1988, of which priority benefits under Title 35, United States Code Section 119 are hereby claimed.

BACKGROUND OF THE INVENTION

The present invention relates to a process for winding a fiber material into a plurality of wrappings and to a winding device useful for the process. The winding device has a rotational axis and two side walls.

Energy absorbing beams such as leaf springs are useful in a great number of applications, mainly in the automobile industry.

Presently multiple-leaf springs made of metals are still being used in the industry although the advantages of fiber reinforced plastic leaf springs such as much lighter weight, longer life and no corrosion problems have been known for several years, see the literature cited in U.S. Pat. No. 4,414,049. The best fiber reinforced plastic leaf springs presently known are the so-called parabolic springs which have a curved shape in the longitudinal direction and a crosssection decreasing in the longitudinal direction of the spring from the central part towards the ends along at least a substantial part of this length. Such leaf springs can absorb energy evenly and have an excellent strength-to-weight ratio.

The extended use of metallic leaf springs is mainly due to the difficulty of producing such a fiber reinforced plastic leaf spring in an economical way.

Known processes for producing fiber reinforced plastic leaf springs are:

(1) prepreg/laminate compression moulding and
(2) filament winding.

According to the first process preimpregnated filaments, cured laminates or layers of dry or wet fabrics are placed into a mould. However, this method is labor-intensive and therefore costly.

Therefore, processes for filament winding have been suggested.

In European published patent application 0 005 916 a method of producing fiber reinforced plastic leaf springs is disclosed wherein layers of fibers are wound onto an elliptical surface of a former by rotating the former about an axis. When a sufficient quantity of fibers are built upon the former, spacer elements preformed from randomly oriented fibers in a resin matrix are applied to the former. Further layers of fibers are then built up by further winding on the former. The resulting assembly is then cut at the ends of the former. This gives two individual part-elliptic leaf springs. The produced spring has first and second layers of fibers which are oriented to lie longitudinally of the spring and between them a spacer element preformed from randomly oriented fibers in a resin matrix. Unfortunately, the spacer element is not able to absorb much energy. The load-bearing portion of the leaf spring, i.e. the fibers which are longitudinally oriented to the spring, has a constant thickness over the entire length of the spring. This decreases the ability of the spring to absorb energy. Furthermore, the use of several materials having different physical properties may cause delamination when the spring is under stress.

In U.S. Pat. No. 4,414,049 a method for producing fiber reinforced plastic leaf springs is disclosed wherein a plurality of resin impregnated filaments are wound into a continuous band of side-by-side filament strands. The side-by-side strands are wrapped about a pattern formed on a base by a plurality of pins whose number is increased as the side-by-side strands are wrapped about the pins. The base into which the pins are inserted is rotated. When wrapping is completed, the thickness of the beam formed is greatest in the area established by the first set of pins and least in the area established by the last set of pins. After the wrapping has been completed, the strands are cut and folded into the desired position: the wrapped strands are then placed into a mold which is closed and exposed to heat and pressure for curing the filament reinforced plastic.

Although leaf springs having the desired shape can be obtained by this process, it is still not economical. The rotating base has to be stopped every time that additional pins are inserted.

European published patent application 0 200 076 discloses a similar winding process. The winding device comprises an axis of rotation and two end walls which are oriented perpendicular to the axis of rotation and arranged in spaced relationship with each other. Each end wall is provided with a plurality of holes through which pins are insertable. Fiber material is wound around the pins. The disclosed process is based on the same principle as the process in U.S. Pat. No. 4,414,049 and has unfortunately the same disadvantages. The winding has to be interrupted every time when additional pins are to be inserted which renders the process slow and uneconomical.

The English Abstract of JP-A-56 141 435 discloses a method of producing a fiber reinforced plastic leaf spring by repeatedly folding a fibrous cloth tape in the longitudinal direction and continuously piling up the portions of the tape. The fibrous cloth has been preimpregnated with a synthetic resin. The drawings of JP-A-56 141 435 illustrate that the process of repeatedly folding the fibrous cloth tape is based on the same principle as the processes disclosed in U.S. Pat. No. 4,414,049 and European published patent application 0 200 076 and consequently has the same disadvantages.

SUMMARY OF THE INVENTION

Accordingly, it would be desirable to provide a process and a winding device for winding the fiber material for a fiber reinforced plastic beam-like geometric figure which allows winding at a reasonably high speed and which does not require frequent interruption of the winding process.

Accordingly, one aspect of the present invention is a winding device having a rotational axis and two side walls arranged substantially parallel to one another and perpendicular to the rotational axis which winding device is characterized in that each side wall is provided with two slits which extend from the middle portion of the side wall from near the rotational axis continuing substantially parallel to the edges of the side wall out to both extreme ends of each side wall (which ends have the greatest radius of rotation when the winding device is in operation) and further characterized in that a supply of bolts is arranged in relation to the winding device in a feeding arrangement whereby the bolts have a smaller diameter than the width of the slits and a greater length than the farthest perpendicular distance between the two side walls.

Another aspect of the present invention is a process for winding a fiber material into a plurality of wrappings consisting of one or more turns of the fiber material, said wrappings having different extensions in a direction in which the main part of the fiber material is oriented during the winding process, by means of a winding device having a rotational axis and two side walls arranged substantially parallel to one another and perpendicular to the rotational axis which process is characterized in that each side wall of the winding device is provided with two slits which extend from the middle portion of the side wall from near the rotational axis continuing substantially parallel to the edges of the side wall out to both extreme ends of each side wall and at least one bolt having a smaller diameter than the width of the slits and a greater length than the farthest perpendicular distance between the two side walls is fed into two adjacent slits in the two side walls while the winding device is in rotation, the bolt(s) is (are) wrapped with one or more turns of fiber material, at least one additional bolt is fed into two adjacent slits in the two side walls while the winding of the fiber material is continued and the wrapping of the bolt(s) with the fiber material and the feeding of the bolts is continued until the desired number of fiber wrappings is reached.

Preferred embodiments of the invention are stated in the dependent claims. The references to the drawings in the claims should not be construed to limit the claims to the drawings.

The fiber material wound according to the process of the present invention is useful for incorporation into a fiber reinforced plastic beam-like form which has a cross-section decreasing in the longitudinal direction of the beam from the central part towards the ends along at least a part of this length.

DETAILED DESCRIPTION OF THE INVENTION

The invention is particularly suited for preparing fiber reinforcement for fiber reinforced plastic beams, especially in the form of leaf springs.

The fiber material which is used for preparing the fiber reinforced beam preferably consists of glass fiber but may also consist of fibers of different natural and synthetic materials such as cotton, polyethylene glycol terephthalate, polyacrylic nitrile, polyamide, aramide, carbon and ceramic fibers.

The fiber material may, for example, be used in the form of filaments, yarns or rovings. Rovings or yarns may be prepared from filaments according to known methods, for example as described in U.S. Pat. No. 4,414,049. Alternatively, the filaments may be fixed into the form of a tape according to techniques well known in the textile industry. In order to increase the torsional rigidity of the fiber reinforced plastic beam, for example, a woven tape having mainly parallel filaments may be used and may also contain filaments that extend diagonally to the direction of the main portion of filaments.

The fiber material may be impregnated prior to the winding process but it is highly preferred to impregnate it only after the winding process. Winding the dry fibers is considerably easier than winding impregnated fibers. Alternatively, semi-dry fibers are suitable in the winding process, for example light curable polyester prepreg rovings. The plastic used for impregnating the fiber material is preferably an epoxy, a polyester or vinylester resin, more preferably an epoxy resin. Both thermosetting resins and resins which are curable at room temperature may be used. The fiber material may be impregnated with the resin as described in European published patent application 0 200 076. After having wound and impregnated the fiber material as described below, it is placed in the form of a beam in a mould having a cavity adapted to the curved shape of the beam with the main part of the fiber material oriented in the longitudinal direction of the beam, the beam thereafter being shaped and the resin being subjected to curing. Preferably, the fiber material is stretched in the longitudinal direction of the beam in conjunction with being placed in the mould. Alternatively, the dry fiber material in the form of a beam is placed in the mould and the resin is injected into the mould and cured.

Figure 1:
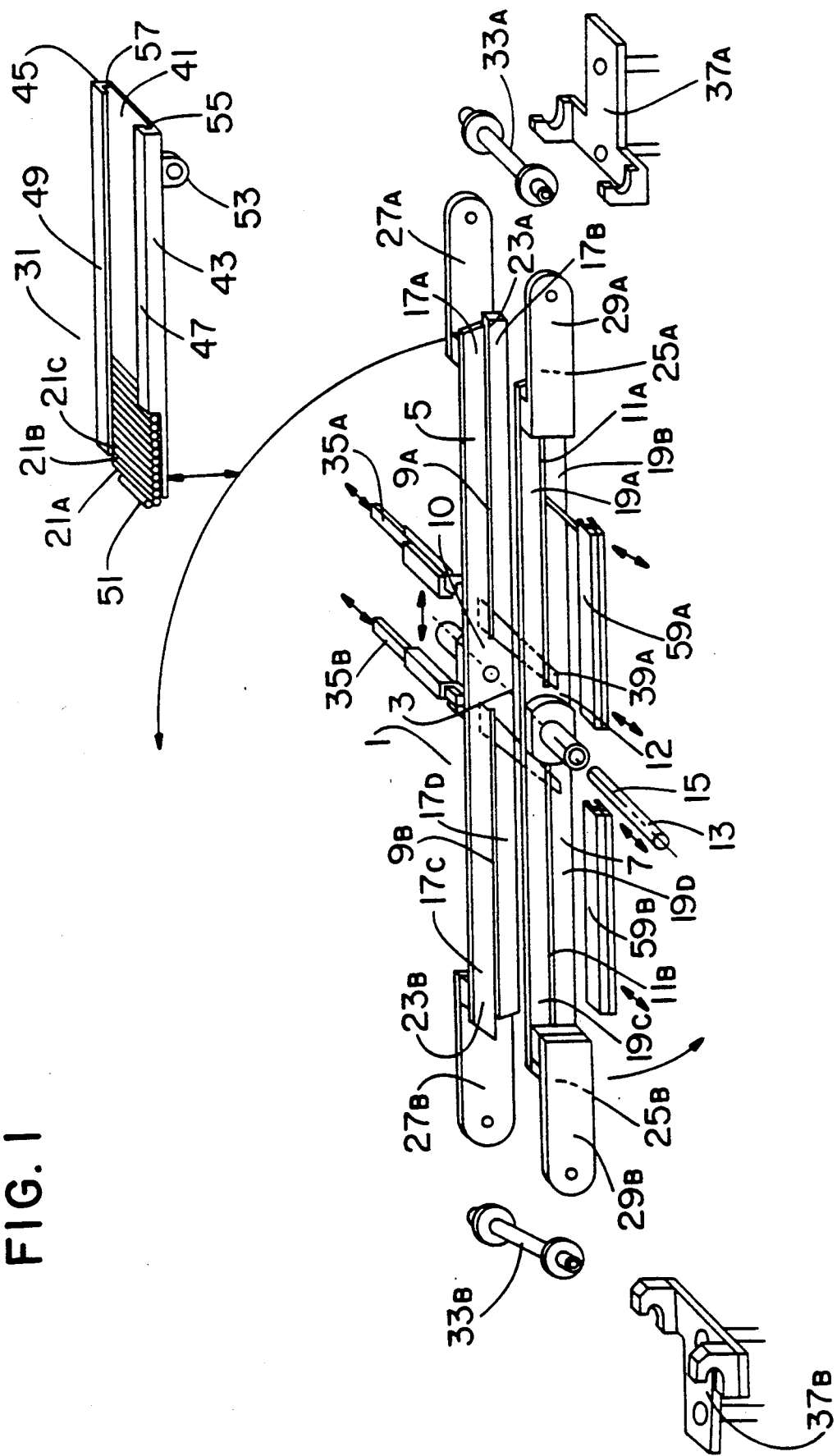
FIG. 1 illustrates a perspective view on one embodiment of the winding device according to the present invention.

Referring now to the drawings, the winding device 1 illustrated by FIG. 1 has a rotational axis 3 and two substantially parallel side walls 5, 7. The rotational axis preferably has a removable central bolt 13 which is preferably provided with a longitudinal aperture 15. The side walls 5, 7 are provided with two slits 9a, 9b and 11a, 11b each. The slits extend from the middle portion 10, 12 of each side wall, that is the portion which is located near the rotational axis 3, substantially parallel to the edges of the side wall to both extreme ends of the side wall. Said extreme ends have the greatest radius of rotation when the winding device is in operation. Either in side wall 5 or in side wall 7 one or both slits may have the shape of a groove of which the opening faces the other side wall of the winding device.

In other words, while the slit in one arm of a side wall 5 or 7 should pass completely through the thickness of the side wall creating access for removal of the bolts and cutting of the fiber loops as described later, the arm of the second side wall facing the first need not have its thickness completely penetrated by a slit. The second side wall may have its inner surface rabbeted, thereby forming a channel that faces the slit in the first side wall and one end of a bolt then may fit into the channel while the other end passes completely through the slit and out the other face of the first side wall.

When in operation, the winding device may be driven by a motor, not shown. The motor may be arranged in such a way that both side walls 5, 7 are rotated synchronically but separately. However, preferably the motor drives only one side wall and the driving force is transmitted from this side wall to the other side wall by at least one, preferably two, joining pieces 39a, 39b. The joining pieces 39a, 39b preferably have the cross-section shape of a trapezoidal plate. The plates are longer than the distance between the side walls 5, 7 and have such a thickness that they fit into the slits 9a, 11a and 9b, 11b. The preferred slightly trapezoidal cross-section form of the plates permits them to be wedged into the ends of slits 9a, 11a and 9b, 11b when the slits are tapered near the rotational axis (not shown in the Figures).

A supply of bolts 21a, 21b, 21c is arranged in relation to the winding device in a feeding arrangement. The expression "supply of bolts is arranged in relation to the winding device in a feeding arrangement" as used herein means that the supply of bolts is arranged in such a relationship to the winding device that the bolts can be fed into the slits when the winding device is in operation. The bolts have a smaller diameter than the width of the slits 9a, 9b; 11a, 11b and have a greater length than the distance between the two side walls 5, 7. Preferably, the bolts have a) a cylindrical portion having a smaller diameter than the width of the slits and a greater length than the distance between the two side walls 5, 7 and (b) an end portion whereby a substantially circular groove is located between the cylindrical portion and the end portion. Preferably, the end portion has also a cylindrical shape and has about the same diameter as the cylindrical portion (a). The total length of the bolts preferably is no more than about twice the distance between the two side walls 5, 7. Alternatively, the bolts may consist of the above described cylindrical portion (a) and a head-shaped end portion (b) having a greater diameter than the cylindrical portion (a). The head-shaped portion or circular groove on a bolt serve to facilitate withdrawal of the bolts by providing an easily gripped portion near an end of each bolt. This is described in greater detail later where removal of the bolts with extractor devices is discussed. As a further alternative, the bolts may have another cross-section and may be provided with cutting edges facing outwardly and extending at least along a substantial portion of the length of the bolts. These may be employed when it is desired to cause the loops of fiber material to be cut upon removal of the bolts, as described later in greater detail.

The bolts 21a, 21b, 21c are located in a storage device 31. Various types of storage devices are useful, such as bolt magazines. The storage device should allow an easy removal of a chosen number of bolts. Preferably, the storage device 31 has a bottom plate 41, two end walls 43, 45 and two cover pieces 47, 49. Preferably, the storage device 31 has two lateral grooves 55, 57 whereby each groove is formed by a cover piece, an end wall and the bottom plate. The storage device is rotatable about pivot 53. Preferably, one side of the bottom plate 41 is not flush with the end walls 43, 45 but protruding. A bolt retainer 51 is fixed to the protruding part of the bottom plate. The bolt retainer 51 has for example the shape of a bar which is fixed to the bottom plate 41 in a parallel direction to the bolts 21a, 21b and 21c and which is shorter than the distance between the two side walls 5, 7 of the winding device 1.

Although only one storage device 31 is shown in FIG. 1, more storage devices, for example two or three, may be arranged to the winding device of the present invention. This allows an easy variation of the number of bolts which may be fed into the slits 9a, 11a and 9b, 11b during one turn of the side walls 5, 7 when the winding device is in operation.

Each side wall 5, 7 is separated by the two slits, which may be in the shape of a groove in one side wall, into four branches 17a, 17b, 17c, 17d; 19a, 19b, 19c, 19d. Preferably, one branch 17b, 17c; 19b, 19c of each pair of branches separated by a slit is provided with a protruding end 23a, 23b; 25a, 25b which is longer than the radius of the bolts 21a, 21b, 21c. The four protruding ends 23a, 23b; 25a, 25b, that is two per side wall, are arranged rotationally-symmetrically to the rotational axis 3 and mirrorsymmetrically to a plane which is parallel to the side walls 5 and 7. The length of the protruding ends depends upon how many bolts 21a, 21b, 21c should be fed or put into the slits 9a and 11a, 9b and 11b at once. If only one bolt is to be fed into a slit at once, the protruding ends have a length which is greater than the radius and up to the diameter of one bolt. If the protruding ends are longer, more than one bolt can be fed into a slit when the winding device is in operation.

In a preferred embodiment of the winding device each side wall 5, 7 is provided at its extreme ends with lateral extensions 27a, 27b; 29a, 29b which are perforated Instead of a perforation the lateral extensions may have a slit and may be provided with a blocking device, for example a catch facing outwardly. The above described storage device 31 preferably has a smaller width than the distance between two adjacent lateral extensions 27a and 29a 27b and 29b. The winding device 1 preferably has spools 33a, 33b which are preferably hollow and which may be attached to the lateral extensions 27a and 29a; 27b and 29b by means of pins (not shown) which may be passed through the perforations in two adjacent lateral extensions and the hollow spool. The winding device may further have one or more spool holders 37a, 37b, one or more cutting devices 35a, 35b and one or more bolt extractors 59a, 59b of which the functions will be described in more details when describing the winding process of the present invention.

The above described winding device 1 is useful for winding the fiber material for a fiber reinforced plastic beam which has a cross-section decreasing in the longitudinal direction of the beam from the central part towards the ends along at least a substantial part of this length and which can be brought into a curved shape. Before putting the winding device in operation, parallel filaments, rovings or yarns which may have been combined to strands or types, are introduced into the longitudinal aperture 15 of the central bolt 13. If only one side wall 5 or 7 is set up to be driven by a motor (not shown) one or more, preferably two joining pieces 39a, 39b are introduced. into the slits 9a and 11a, 9b and 11b, preferably near the rotational axis 3, in order to firmly connect the two side walls 5 and 7. Prior to or after the introduction of the joining pieces 39a, 39b into the slits of the winding device 1, the ends of the rovings, threads or strands are or the end of the tape is introduced into the longitudinal aperture 15. In order to facilitate the introduction of the ends of the filaments, rovings, yarns or strands into the longitudinal aperture 15, these ends are preferably connected with each other, for example by the means of a thermoset or thermoplastic resin. For example, the ends can be attached to a plate which fits into the longitudinal aperture 15 by the means of a resin. The winding device 1 is then put into operation and the desired number of turns of the fiber material is wrapped around the central bolt 13 and the joining pieces 39a, 39b. While the rotation of the winding device is continued, the storage device 31 for the bolts 21a, 21b, 21c is brought close enough to the rotating side walls 5, 7 to enable the protruding ends 23a and 25a or 23b and 25b to lift the desired amounts of bolts 21a, 21b out of the storage device 31. For example, the storage device 31 may be moved about a pivot 53 and/or shifted along an axis (not shown). Most preferably, the contact between the protruding ends of the side walls 5, 7 and the bolt(s) to be removed from the storage device 31 takes place when the angle between the side walls 5, 7 and a horizontal plane is from 20° to 60°. The protruding ends 23a and 25a or 23b and 25b then lift one or more bolts which are located closest to the bolt retainer 51 out of the storage device 31. The bolts then glide in the slits towards the middle portion 10, 12 of the side walls until they touch the fiber material wrapped around the joining pieces 39a, 39b. After the side walls 5, 7 have rotated about the rotational axis 3 for about another 180°, the protruding ends 23b and 25b or 23a and 25a which are located opposite to those mentioned above remove again one or more bolts from the storage device 31. The storage device 31 is then removed from the radius of the protruding ends and the winding of the fiber material is continued until the desired number of turns is obtained. The storage device 31 for the bolts 21a, 21b, 21c is then brought again into the radius of the protruding ends 23a and 25a or 23b and 25b of the side walls 5, 7, two adjacent protruding ends 23a and 25a or 23b and 25b pick up again one or more bolts from the storage device 31, the bolt(s) glide(s) towards the middle portion 10, 12 of the side walls 5, 7 until it touches the fiber material wrapped around the first bolt(s), the side walls 5, 7 are further rotated about the rotational axis 3 for about 180°, the pick-up of the bolt(s) is repeated with the pair of protruding ends 23b, 25b or 23a, 25a located opposite to the first pair of protruding ends and the desired amount of fiber material is wrapped around these bolts.

The process is continued until the desired number of bolts is fed into the slits and the desired amount of fiber material is wrapped around the bolts. During the entire process the side walls 5 and 7 are rotated about the rotational axis 3.

Many variations of the above described sequence of feeding the bolts into the slits and wrapping the fiber material around the bolts are possible. The sequence of bolts and fiber wrappings is adjustable to the desired shape of the fiber reinforced plastic beam. For example, one or more bolts 21a, 21b, 21c may be fed into the slits 9a and 11a and/or 9b and 11b before a substantial amount of fiber material is wrapped around the joining pieces 39a, 39b. As described above with reference to FIG. 1, joining pieces 39a, 39b are not necessarily introduced into the winding device 1. Furthermore, asymmetrical fiber reinforced plastic beams are obtainable by feeding more bolts into the two adjacent slits 9a and 11a than into the two adjacent slits 9b and 11b or by feeding the bolts into the slits 9a and 11a at intervals which are different from the intervals in which the bolts are fed into the slits 9b and 11b. By an appropriate choice of the length of the protruding ends 23a, 23b; 25a, 25b and by selecting the appropriate distance of the storage device 31 from the protruding ends, more than one bolt can be fed into the slits in the side walls 5, 7 and the number of bolts can be varied during the winding process. Alternatively, the number of fed bolts may be varied during the winding process by making use of more than one storage device as mentioned above.

The shape and the size of the fiber reinforced plastic beam can be varied by variation of the numbers and type of fiber wrapping, the numbers of bolts which are fed into the slits and the frequency of feeding the bolts. For example, a parallel middle section of a fiber reinforced plastic beam is obtained if the joining pieces 39a, 39b and/or a first supply of bolts in the slits is wrapped with a great amount of fiber material without supplying additional bolts. When the feeding of the bolts and the winding of the fiber material is continued, the cross-section of the wound fiber material decreases in the longitudinal direction from the middle portion toward the extreme ends of the side walls (see FIG. 4a and 4b and their description). If it is desired to produce fiber reinforced plastic beams with substantially parallel end sections, the winding of the fiber material is continued after the last bolt has been fed into the two adjacent slits 9a, 11a or 9b, 11b until the desired length of the parallel end sections is reached. A spool 33a, 33b preferably is attached to each pair of perforated lateral extension 27a, 29a and 27b, 29b, for example by the means of a pin (not shown) which is passed through the perforation or slit in the lateral extensions and through the center of the spool. The spools are then surrounded with one or more turns of fiber materials.

After having completed the winding of the fiber material, the rotation of the side walls 5 and 7 is stopped. The spools 33a and 33b are attached to the spool holders 37a, 37b of a stretching device (not shown). The means for attaching the spools 33a and 33b to the lateral extensions 27a, 29a and 27b, 29b, for example pins (not shown), are then removed. The fiber wrappings in the form of loops are tensioned by increasing the distance between the spool holders 37a and 37b. Prior to, during and/or after tensioning the fiber wrappings, the central bolt 13 is removed from the winding device. At least the fiber wrapping next to the rotational axis 3 is then compressed perpendicular to the main orientation of the fiber material and perpendicular to the rotational axis. The joining pieces 39a, 39b are removed from the slits, a cutting device 35a, 35b is introduced into each pair of adjacent slits 9a, 11a and 9b, 11b next to the rotational axis 3 and the bolts are removed from the slits. If the winding device is equipped with joining pieces, they are preferably removed first from the slits and then the cutting devices 35a, 35b are put at their places. The bolts 21a, 21b, 21c may be removed from the slits before, during or preferably after having placed the cutting devices into the slits. If the winding device 1 does not have joining pieces 39a, 39b, it is preferred to remove the bolts located next to the rotational axis, then to introduce the cutting devices into the slits and then to remove the remaining bolts from the slits. The bolts are preferably laterally removed from the slits by bolt extractors 59a, 59b which preferably have the shape of nippers.

The ability to extract the bolts is enhanced and the extraction operation facilitated by the employment of bolts having a substantially circular groove located between the cylinder portion and the end portion of each bolt, preferably quite near the end of same, as previously described in relation to the description of the bolts. Alternatively, employment of a head-shaped end position on each bolt may serve the same purpose of enhancing and facilitating the extraction of the bolts with the bolt extractor devices 59a and 59b. Obviously, the circular groove or head-shaped end position of all the bolts are aligned in such a fashion that the extractor devices will engage that portion of each bolt in like fashion when the extractor devices are applied to remove the bolts. The bolt extractors 59a, 59b are preferably moved perpendicularly to the side walls 5, 7 for removing the bolts from the slits. The cutting devices 35a, 35b are then moved in the slits from the middle portion of the side walls 5, 7 towards their extreme ends whereby as many as desired, preferably all, fiber wrappings in the form of loops are cut except the wrapping surrounding the spools 33a and 33b. If the bolts are provided with knives, the fiber wrappings may be cut by moving the bolt extractors 59a, 59b parallel to the side walls from the middle portion of the side walls towards their extreme ends whereby the bolts are removed from the slits and the fiber wrappings are cut at the same time.

The fiber material is then transferred to a mould while it still remains under tension provided by the stretching device (not shown) which is equipped with the spool holders 37a, 37b. The fiber material is then impregnated in the mould and cured as described above. Since the fiber wrapping surrounding the spools 33a, 33b is not cut, the fiber material contains end loops. If these loops are undesirable, this portion of the fiber material can be removed. For example, the fiber material may be placed in a mould which is shorter than the length of the fiber material along its main orientation. Both ends of the fiber material projecting from the mould may be cut off. In many cases however, it is preferred not to remove the loops. For example, they are useful for suspending the fiber reinforced plastic beam.

The winding device and the process of the present invention allow a continuous production of a fiber reinforced plastic beam which has the desired shape and a high level of fiber orientation which is important for the required properties of the beam such as an excellent strength-to-weight ratio.

Figure 2:
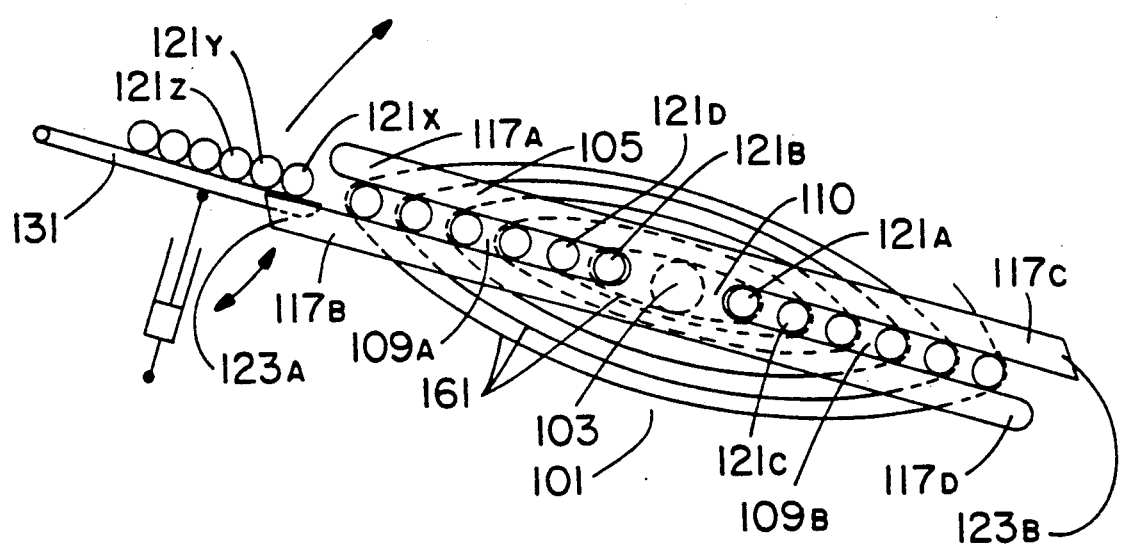
FIG. 2 is a schematic drawing of a side view on the winding device illustrated by FIG. 1.

FIG. 2 illustrates schematically a side view of the winding device 101 having a rotational axis 103. The side wall 105 has a middle portion 110 and four branches 117a, 117b and 117c, 117d. The branches 117a, 117b and 117c, 117d are separated by two slits 109a, 109b. Two branches 117b, 117c have protruding ends 123a, 123b which are arranged rotationallysymmetrically to the rotational axis 103. The bolts 121a and 121b have been fed into the slits 109a and 109b during one single rotation of the side wall 105. The bolts 121a and 121b have then been surrounded by a wrapping of fiber material 161, additional bolts 121c and 121d have been fed into the slits which have been again surrounded by a wrapping of fiber material and the feeding of bolts and winding of the fiber material has been continued until the process has reached the stage illustrated by FIG. 2. FIG. 2 further illustrates how the bolts 121x, 121y and 121z which are still located in the storage device 131 can be lifted out of the storage device by the protruding end 123a.

Figure 3:
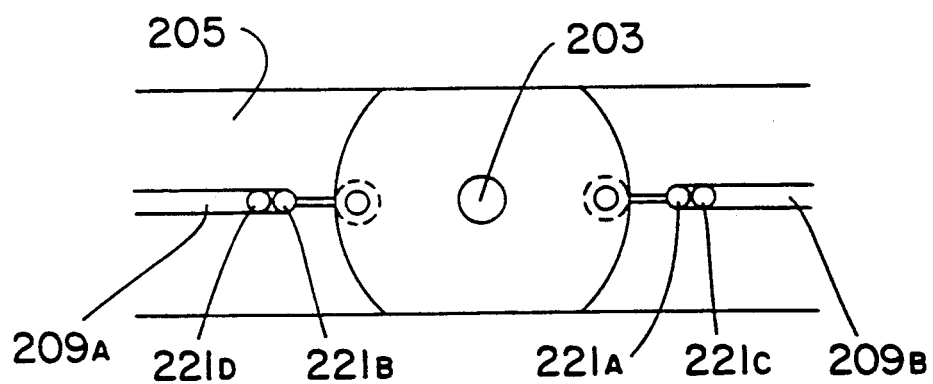
FIG. 3 illustrates a side view on the middle portion of a side wall of another embodiment of the winding device according to the present invention.

Referring now to FIG. 3, the side wall 205 has two slits 209a, 209b. The width of the slits 209a, 209b is diminished near the rotational axis 203. The diminished portion of the slits 209a, 209b is smaller than the diameter of the bolts 221a, 221b, 221c, 221d. The joining pieces and cutting devices described with reference to FIG. 1 (not shown in FIG. 3) may be introduced into these portions of the slits having a diminished width.

Figure 4A:
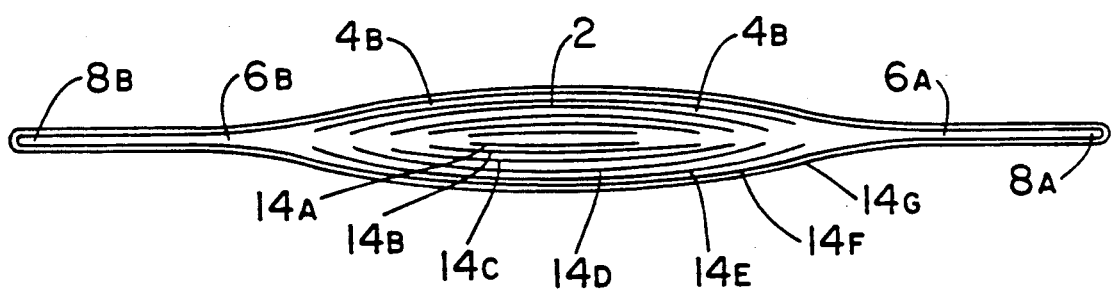
FIG. 4a and b illustrate a longitudinal view on a fiber reinforced plastic beam which comprises fiber material wound according to one embodiment of the process of the present invention.
Figure 4B:
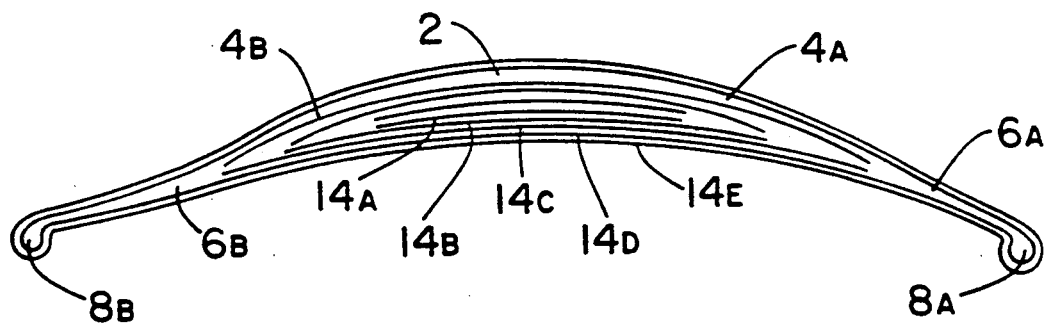

FIG. 4a and 4b illustrate a fiber reinforced plastic beam which is produced according to a preferred process of the present invention. FIG. 4a illustrates a longitudinal view of a fiber reinforced plastic beam in the straight shape before placing it into a mould. FIG. 4b illustrates a longitudinal view on a fiber reinforced plastic beam having a curved surface in its longitudinal direction after a change in shape in a mould. The wrappings 14a, 14b, 14c, 14d, 14e, 14f, 14g have been cut in the "neutral" axis, i.e., in the direction along the slits 109a and 109b in FIG. 2. The fibers are highly oriented. The fiber reinforced plastic beam contains a middle section 2 and two end sections 6a, 6b having end loops 8a, 8b. The fiber wrappings in the middle section and in the two sections are substantially parallel. The plastic beam also contains two taper sections 4a, 4b.

What is claimed is:

1. A winding device having a rotational axis and two side walls arranged substantially parallel to each other and perpendicular to the rotational axis, each side wall being provided with two slits which extend from the middle portion of the sidewall from near the rotational axis continuing substantially parallel to the edges of the side wall out to both extreme ends of each side wall and a supply of bolts arrnged in relation to both extreme ends of the two side walls in a feeding arrangement whereby the bolts have a smaller diameter than the width of the slits and a greater length than the distance between the two side walls.

2. The winding device of claim 1 wherein the rotational axis has a removable central bolt which bolt is provided with a longitudinal aperture.

3. The winding device of claim 2 wherein both extreme ends of each side wall are provided with a protruding end which is longer than the radius of the bolts and the four protruding ends are arranged rotationally-symmetrically to the rotational axis of the winding device and mirror-symmetrically to a plane which is parallel to the side walls.

4. The winding device of claim 2 wherein each side wall is provided at its extreme ends with lateral extensions which are perforated.

5. The winding device of claim 4 wherein the support of bolts consists essentially of one or more storage devices containing the bolts and which storage devices have a smaller width than the distance between the two adjacent lateral extensions of each side wall.

6. The winding device of claim 1 wherein the bolts have
  (a) a cylindrical portion having a smaller diameter than the width of the slits and a greater length than the distance between the two side walls and
  (b) an end portion,
whereby a substantially circular groove is located on the circumference of the bolts between the cylindrical portion and the end portion of each and the rotational axis has a removable central bolt which is provided with a longitudinal aperture.

7. The winding device of claim 6 wherein each side wall is separated by the two slits into four branches and one of two branches separated by a slit is provided with a protruding end which is longer than the radius of the bolts.

8. The winding device of claim 7 wherein each side wall is provided at its extreme ends with lateral extensions which are perforated.

9. The winding device of claim 8 wherein the supply of bolts consists essentially of one or more storage devices containing the bolts and which storage devices have a smaller width than the distance between the two adjacent lateral extensions of each side wall.

10. The winding device of claim 6 wherein each side wall is provided at its extreme ends with lateral extensions which are perforated.

11. The winding device of claim 10 wherein the supply of bolts consists essentially of one or more storage devices containing the bolts and which storage devices have a smaller width than the distance between the two adjacent lateral extensions of each side wall.

12. The winding device of claim 1 wherein the bolts have
(a) a cylindrical portion having a smaller diameter than the width of the slits and a greater length than the distance between the two side walls and
(b) an end portion,
whereby a substantially circular groove is located between the cylindrical portion and the end portion of each.

13. The winding device of claim 1 wherein each side wall is provided at its extreme ends with lateral extensions which are perforated.

14. The winding device of claim 1 wherein both extreme ends of each side wall are provided with a protruding end which is longer than the radius of the bolts and the four protuding ends are arranged rotationally-symmetrically to the rotational axis of the winding device and mirror-symmetrically to a plane which is parallel to the side walls.

15. The winding device of claim 14 wherein each side wall is provided at its extreme ends with lateral extensions which are perforated.

16. The winding device of claim 15 wherein the supply of bolts consists essentially of one or more storage devices containing the bolts and which storage devices have a smaller width than the distance between the two adjacent lateral extensions of each side wall.

17. The winding device of claim 1 wherein the supply of bolts consists essentially of one or more storage devices containing the bolts and which storage devices have a smaller width than the distance between the two adjacent lateral extensions of each side wall.

* * * * *